May 6, 1930.  G. F. RYAN ET AL  1,757,220
GRADING MECHANISM FOR PATTERN COPYING MACHINES
Filed Oct. 29, 1926  7 Sheets-Sheet 1

May 6, 1930.  G. F. RYAN ET AL  1,757,220
GRADING MECHANISM FOR PATTERN COPYING MACHINES
Filed Oct. 29, 1926   7 Sheets-Sheet 5

May 6, 1930. G. F. RYAN ET AL 1,757,220
GRADING MECHANISM FOR PATTERN COPYING MACHINES
Filed Oct. 29, 1926  7 Sheets-Sheet 7

INVENTORS -
George F. Ryan
Elmer H. Burke
By Their Attorney,
Nelson Howard

Patented May 6, 1930

1,757,220

UNITED STATES PATENT OFFICE

GEORGE FRANCIS RYAN AND ELMER HUNTON BURKE, OF LYNN, MASSACHUSETTS, ASSIGNORS, BY MESNE ASSIGNMENTS, TO UNITED SHOE MACHINERY CORPORATION, OF PATERSON, NEW JERSEY, A CORPORATION OF NEW JERSEY

GRADING MECHANISM FOR PATTERN-COPYING MACHINES

Application filed October 29, 1926. Serial No. 145,086.

This invention relates to methods of and machines for producing irregular objects from models, such, for example, as lasts, gunstocks, hat blocks and patterns for shoes, gloves, clothing or other articles. The invention is herein disclosed for purposes of illustration with particular reference to its application to the production of lasts, but in various aspects, as above indicated, the invention is not limited to last production, nor is it limited to grading solid or three-dimensional objects, as distinguished from grading plane or two-dimensional objects. In its machine aspect, the invention is herein illustrated as embodied in a last lathe of the type disclosed in United States Letters Patent No. 544,891, granted August 20, 1895, on the application of W. F. Gilman, the illustrated machine being adapted for use in practising the novel method provided by this invention.

Length and width grading mechanisms can be considered broadly as comprising a driving member, a driven member, and mechanism connecting them which modifies in some desired way the drive transmitted from one to the other. Each length or width grading mechanism found in ordinary last lathes of the type disclosed in said Letters Patent No. 544,891 comprises a swinging lever (the length grading lever and the fan-board respectively) connected to one or the other of the driving and driven members (the cutter and model wheel carriages, and the swing frame and model wheel slide, respectively) by a link. The action of these mechanisms is substantially pantographic.

While these mechanisms are satisfactory for pantographic reproduction of a model, they are of small value in effecting variations from pantographic reproduction which are sometimes desired by the shoe manufacturer. For example, he may want to lengthen or shorten the toe, while maintaining the "foot fitting" portion of the last as it is. Or it may be desirable to hold certain lateral dimensions of the last unchanged, while varying others, or to alter the proportions of the last generally, in both length and thickness, by varying from the normal pantographic reproduction in some systematic way. These considerations have necessitated much hard work by the model maker which is very expensive.

The general problem, above outlined, of effecting mechanically irregular grading has been solved by the inventions disclosed and claimed in United States Letters Patent No. 1,362,182, granted December 14, 1920, on application of F. W. Potter, No. 1,362,185, granted December 14, 1920, on application of S. E. Boynton, and in application Serial No. 429,719, filed December 10, 1920, now Patent No. 1,716,672, June 11, 1929, in the name of Laurence E. Topham. The machines provided by the inventions referred to will deal satisfactorily with almost any conceivable problem relating to anomalous length or width grading.

We have found that a very large proportion of such problems arising in a last factory relate to a very limited part of the field covered by the inventions mentioned, and it is accordingly a principal object of our invention to simplify anomalous length or width grading, while retaining the advantages characteristic of the solutions of this problem above referred to and providing adequately for dealing with practical problems of this nature, such as commonly arise in a last factory under ordinary conditions.

Of the class of problems under consideration, the types most frequently met in a last factory and with which our invention is peculiarly adapted to deal may be stated as follows: 1. The model is to be divided into a plurality of sections lying end-to-end along its length, and these sections are to be "graded," that is, stretched or shrunk, as the case may be, at progressively increasing or decreasing rates from one end to the other. The toe extension problem noticed above is an example of this problem. 2. The model is to be divided into a series of cylindrical tubes (including the rod-like central piece), lying one without the other, and these tubes are to be "graded," that is, laterally stretched (or shrunk) at progressively increasing or decreasing rates from the inside to the outside. The preservation of the width of the bottom at a certain locality, when cutting lasts of varying girths, treated more broadly by the invention of Topham, above mentioned, is an example of this problem.

Considered in its machine aspect, the present invention provides a novel machine organization by the use of which, for example, the forepart of a last may be stretched or shrunk lengthwise relatively to the heel part, or vice versa. In the illustrated machine, this is accomplished by the provision of a plurality of links connecting the length grading swinging lever with the cutter carriage. These links are arranged to come into action one after the other by means of lost motion connections, shown as pin and slot connections, with one of the elements they connect. The arrangement is such that the pins ride out into the slots of the idle links while the operative link is driving, the swinging action of the lever effecting the change from one link to the next as the work proceeds. The links are connected to the swinging lever at different points, thus securng the different grading rates, and the arrangement is such that the action may begin at either end of the series of links, so that the more rapid grading action may come in first or last, as desired. Similarly, to provide for effecting the irregular width grading above discussed, the width grading mechanism of the illustrated machine comprises a plurality of links connecting the fan-board with the swing frame. The construction and action of the mechanism are similar to that above discussed, as will be seen.

In its method aspect, the invention provides for solving the width grading problem above referred to by dividing a model into a series of concentric cylindrical tubes and grading these tubes at progressively varying rates, that is, reproducing them in the work in progressively more and more thickened (or thinned) relation to one another from the inside to the outside or vice versa. Thus, for example, any desired width line on the model bottom may be so related to the cylinder which bounds two of the tubes mentioned, that the length of the line will grade in any way desired so that the relation between the graded last and its graded insole pattern may be preserved.

The invention will now be described with reference to the accompanying drawings which show a preferred machine embodying its machine features and by means of which the herein disclosed novel method may be advantageously practised.

In the illustrated machine, the main frame 10, swing frame 12, model wheel carriage 14, model wheel slide 16, model wheel 18, and fan-board 20 resting against a vertically adjustable feeler 22 at the rear end of the model wheel slide, are of ordinary construction such as is shown in the Letters Patent No. 544,891 above referred to, and reference may be had to said Letters Patent for a complete disclosure of parts of the machine not fully shown and described herein.

The model and block rotating mechanism in the swing frame and the cutter carriage 24 and cutter drive may be of any desired construction. As illustrated, they are constructed and operate as disclosed in our application Serial No. 145,085, filed October 29, 1926.

Figure 1:
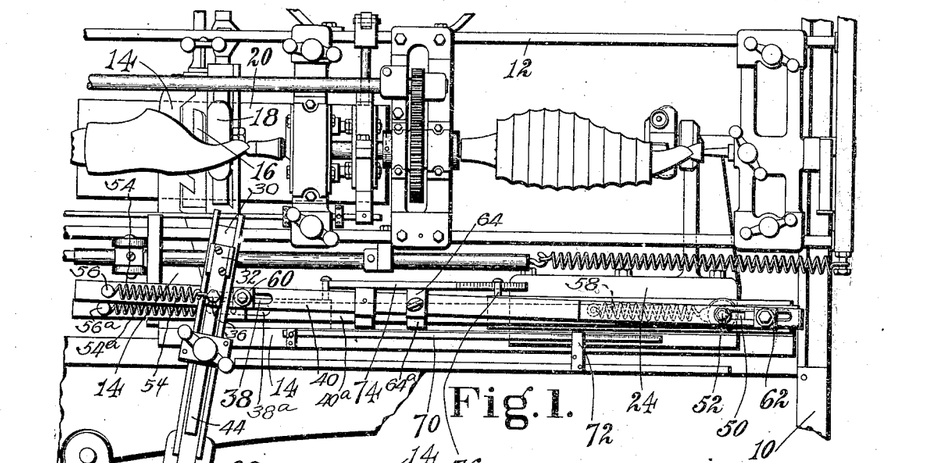
Fig. 1 is a front elevation of the length grading mechanism.
Figures 2, 3, 4:
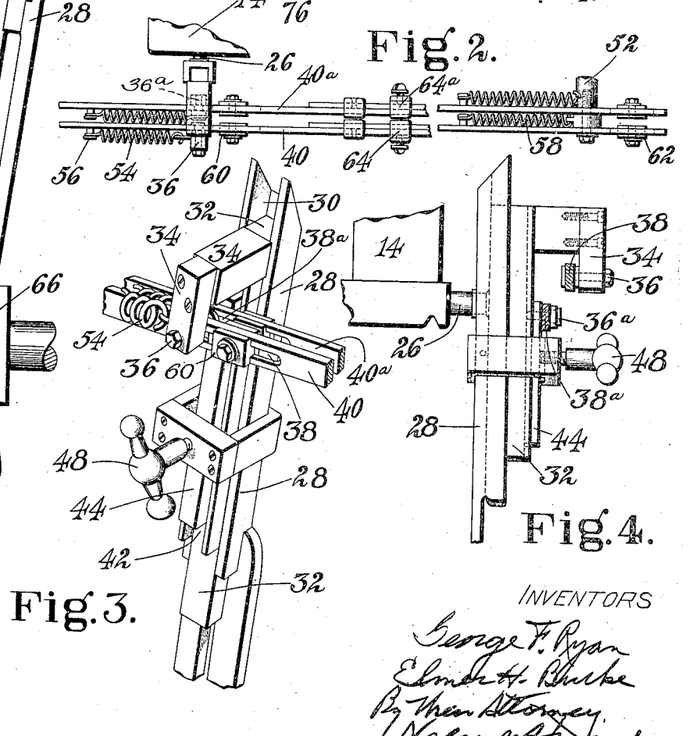
Fig. 2 is a plan.
Fig. 3 is a perspective of the length grading lever.
Fig. 4 is a detail side elevation.

The cutter carriage 24 and model wheel carriage 14 are connected by a novel length grading mechanism. The model wheel carriage 14 has a horizontally extending stud 26 (Fig. 4) on which is hung a grading lever 28, having a longitudinal slideway 30, in which a slide 32 is adjustable. This slide has an overhanging arm 34 having a stud 36 extending through a slot 38 in a link 40. The slide 32 contains a second slideway 42 in which is mounted a slide 44 having a stud 36$^a$ which extends similarly into a slot 38$^a$ in a link 40$^a$. A clamp 48 holds the slides and the ends of the links in any desired positions along the lever 28. The other ends of the links are likewise slotted at 50 and mounted on a long stud 52 extending from the cutter carriage.

Each link is provided with a spring 54 connecting the stud 36 to a stud 56 on the link. the spring thus tending to hold the stud 36 in the left end of the slot 38. At the other end of the link a spring 58 similarly tends to hold the stud 52 in the left end of the slot 50. Stops 60 and 62 are provided, adjustable along the slots, and the length of the links can be adjusted by clamp devices at 64, as shown. While we have shown only two links it is contemplated that any desired number will be used, all mounted side by side on the stud 52, and all independently slidably adjustable up and down the grading lever 28, which, as usual, is slidably pivoted at 66. The springs are so heavy that they are not stretched from their initial lengths by the drag of the model wheel carriage.

Figure 5:
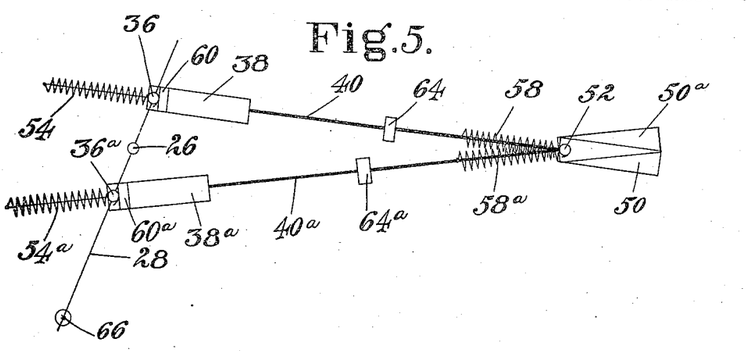
Figs. 5, 6, 7, 8, 9 and 10, are diagrams in groups of three, illustrating the theory and use of the length grading mechanism.

This novel grading mechanism is used as follows: Suppose it is desired to grade the forepart of the last longer than the corresponding part of the model and the rear end of the last shorter than the corresponding part of the model. See Figs. 5, 6 and 7. The link 40 is set above the stud 26 and the link 40ᵃ below it on the grading lever 28 to give the desired grade in the two sections of the last, the connections 64 are loosened and the model wheel and cutter carriages are set so that the model wheel and cutter are opposite the points of the model and block where the change in grade is desired to take place. The springs 54 and 58 operate to draw the studs to the ends of the slots in both links, and the connections 64 are tightened. This condition is shown in Fig. 5. The stops 60 are set up against the studs 36, as the connection at the left ends of the links in this problem is a simple pivotal one.

Figure 6:
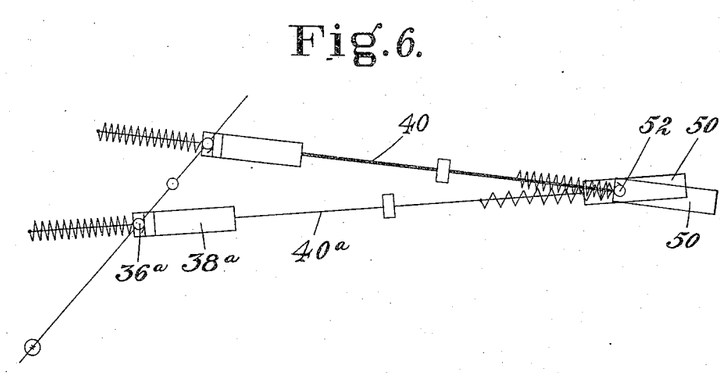

The carriages are then thrown to the right as usual and the cutting begun. The condition at the beginning of the cutting is shown in Fig. 6. As the grading lever swings to the right before beginning the cut, the stud 52 slides out into the slot 50ᵃ due to the relative movement of the links as the lever swings.

Figure 7:
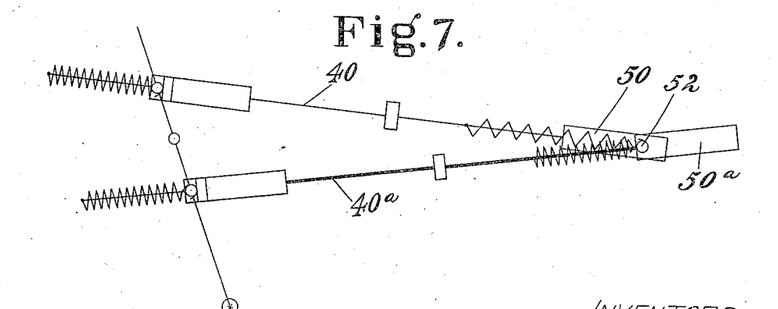

The machine then drives the cutter carriage to the left, as usual, and the cutter carriage drives the model wheel carriage through the link 40, the link 40ᵃ remaining idle until the Fig. 5 position is reached. After this time the link 40ᵃ does the driving and the link 40 is idle, the stud 52, riding out into the slot 50 as shown in Fig. 7. In Fig. 6 the cutter is moving more rapidly than the model wheel, and in Fig. 7 the reverse is true, and the last cut will be graded as specified.

It will be seen that we have here two length grading mechanisms operating in succession, one working while the other is idle, the drive shifting from one to the other in the Fig. 5 position. In this and all the following diagrams the driving link is indicated by a heavier line than the idle link.

In case three links are used, there will be two Fig. 5 positions, where the shift takes place from the first to the second, and from the second to the third, as will be well understood; and so on for any desired number.

Figure 8:
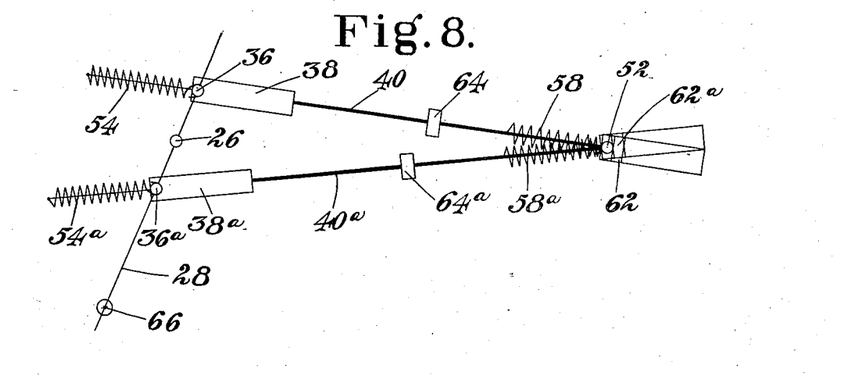
Figure 9:
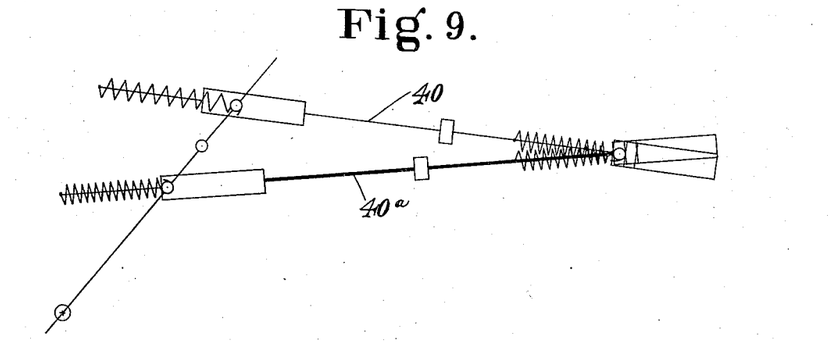
Figure 10:
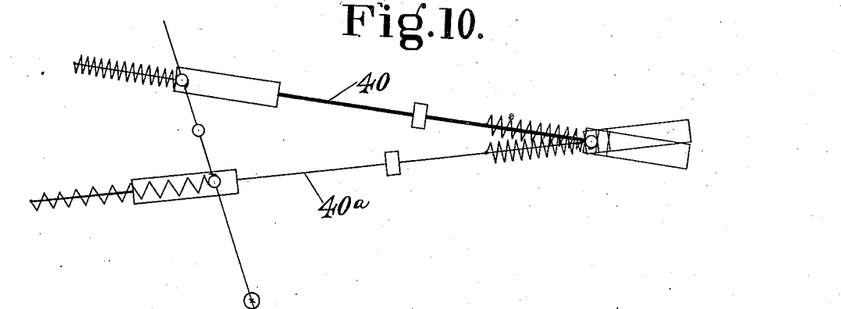

Figs. 8, 9 and 10 show the reverse problem, of shortening the toe and lengthening the heel. The stops 62 are set at the right ends of the links, the stops 60 being omitted. In this case the link 40ᵃ begins the drive and the link 40 finishes it. The machine is initially set in the same manner as before.

It is of course not necessary that the links be connected to the grading lever on opposite ends of the stud 26. They can be adjusted anywhere, but the upper will always exert a larger grading factor than the lower, that is, it will stretch the last more rapidly or shrink it more slowly.

By the above described length grading mechanism the model is in effect divided into sections by planes perpendicular to its axis of rotation and these sections are reproduced in the block at different rates of grade, the rates varying progressively, that is, always increasing or always decreasing from one end of the series to the other.

Figure 11:
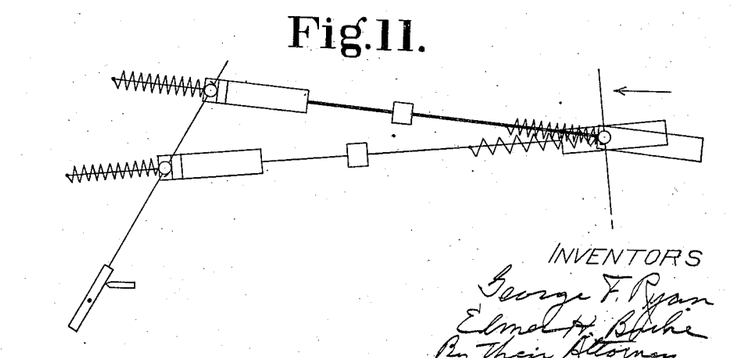
Figs. 11, 12, 13, 14, 15 and 16, are similar diagrams illustrating the theory and use of the width grading mechanism.
Figure 12:
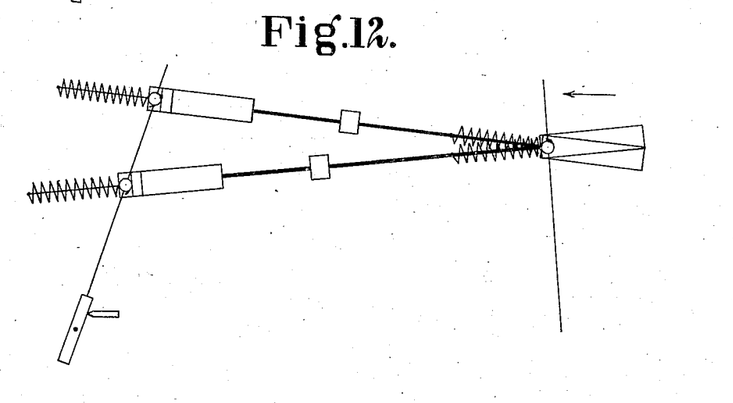
Figure 13:
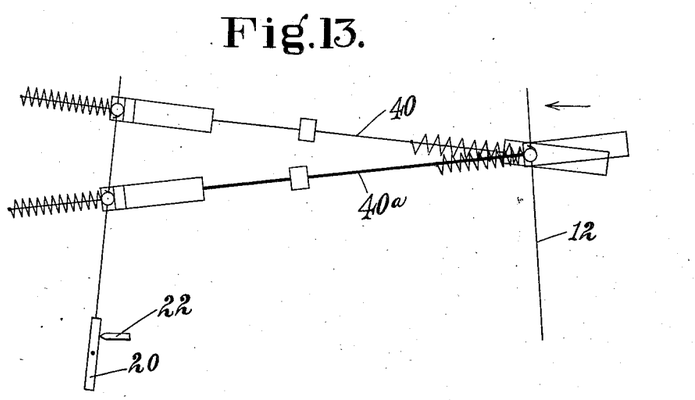

Our invention is also applicable to the width grading mechanism. See Figs. 11, 12 and 13. The fanboard 20 corresponds to the length grading lever 28, and the links 40 are independently adjustable along the vertical arm by which it is tilted. The other ends of the links are connected to the swing frame 12 which corresponds to the cutter carriage. The feeler 22 corresponds to the model wheel carriage. Figs. 11, 12 and 13 correspond to Figs. 6, 5 and 7 respectively, and show the driving phenomena as the swing frame falls toward the model wheel (as indicated by the arrows). The mechanism shown in Figs. 11, 12 and 13 will, in effect, divide the model into a central cylinder 68 (Fig. 23) surrounded by a tube 69. The portion 69 will be width graded by the link 40 and the portion 68 by the link 40ᵃ. As shown in Figs. 11, 12 and 13, both portions will be magnified, the outside one more than the inside one. The theory of the mechanism is just the same as that explained above. It will be clear that the swing frame can drive the fanboard in either direction, as is necessary here.

Figure 14:
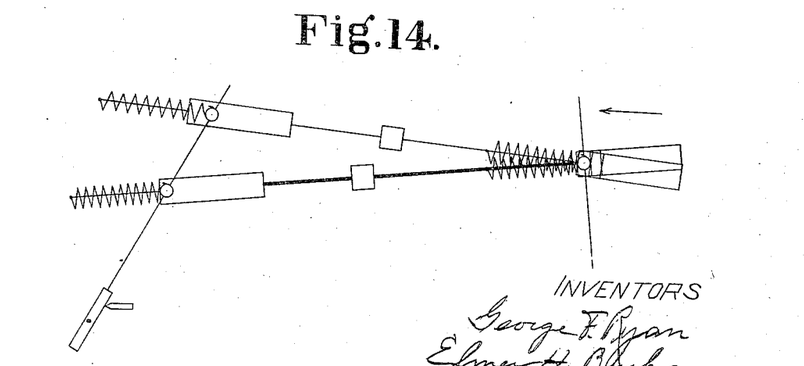
Figure 15:
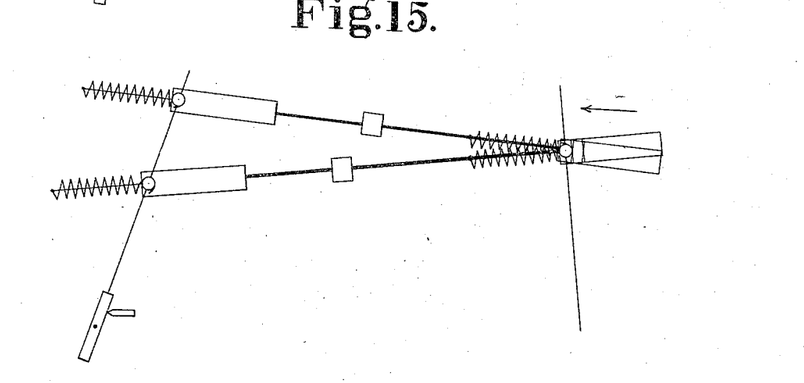
Figure 16:
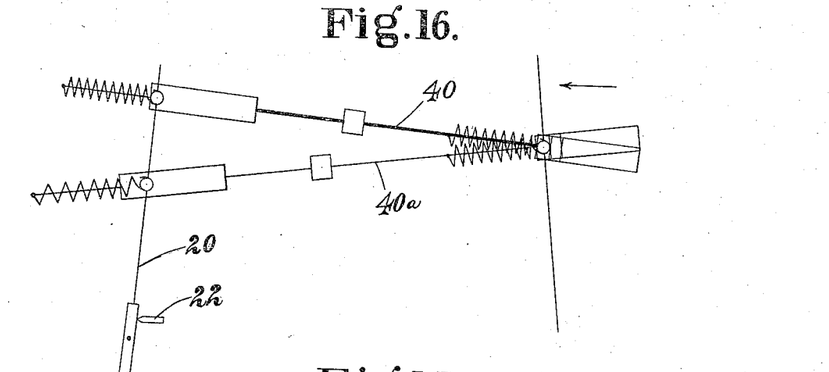

Figs. 14, 15 and 16 correspond to Figs. 9, 8 and 10, respectively, showing the reverse width grading problem. Here the outside of the model will be magnified less than the inside.

Of course any desired number of links may be used here as in the case of the length grader. Three links will divide the model into a central rod and two tubes, one outside the other, and so on. In the appended claims the members of this series of rod and tubes are all generically called "tubes," or the like, to avoid circumlocution.

Thus the machine is adapted to practice our novel method, above mentioned, of grading a series of tubes, one outside the next, into which the model may be regarded as divided, at progressively increasing or decreasing rates.

A second embodiment of the invention will now be briefly described. We have found that the link construction, from one point of view, can be simplified by providing a simple pivotal connection, merely, to the cutter carriage (or swing frame) and retaining the slotted connection to the swinging lever only. The stops are discarded and the springs now are thrown to one side or the other of the pins 36, according to the action desired. This mechanism is illustrated by the diagrams shown in Figs. 17–22.

Figure 17:
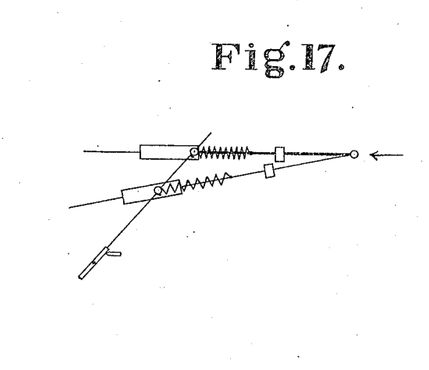
Figs. 17, 18, 19, 20, 21 and 22, are similar figures, illustrating a modified form applicable to both length and width grading mechanisms.
Figure 18:
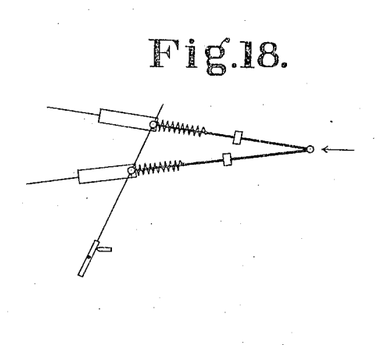
Figure 19:
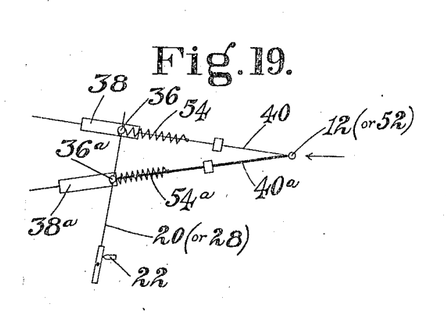

Figs. 17, 18 and 19 correspond to Figs. 6, 5 and 7 and to Figs. 11, 12 and 13. The springs 54 are here placed on the right of the studs 36, and tend to pull them to the right ends of the slots 38. The action is exactly as described in connection with Figs. 11, 12 and 13 or Figs. 6, 5 and 7.

Figure 20:
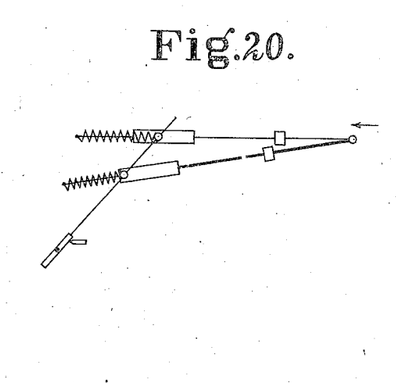
Figure 21:
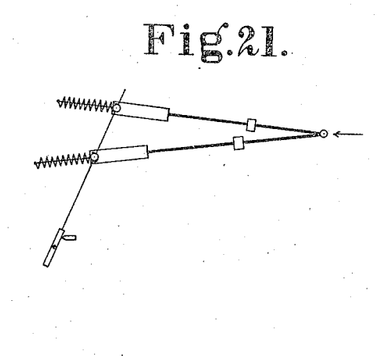
Figure 22:
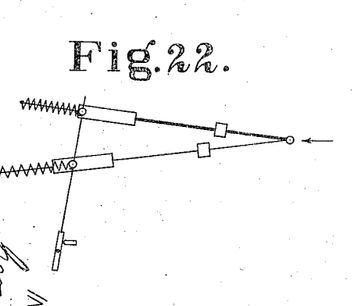

Figs. 20, 21 and 22 correspond to Figs. 9, 8 and 10 and Figs. 14, 15 and 16, and will be understood without further description.

We have also provided two scales to facilitate setting the length grading mechanism. While the last lathe length grading lever has always been provided with a setting scale, the use of this scale is not as simple as it might seem and several blocks always have to be cut by trial and wasted before the proper length is obtained. Suppose, for example, that the model is 9 inches long and it is desired to stretch it 3 sizes or one inch. If the thickness of the model wheel and cutter is one inch, the model wheel must travel 10 inches while the cutter travels 11 inches (in order to reach around the ends and reproduce them), and the grading factor is 11/10 instead of 10/9. The setting scale on the lever is graduated to read in "sizes" of 1/3 inch each, but since the grading factor required to stretch the model 1/3 inch depends on the model length the use of such a scale has required raising and lowering the lower pivot of the grading lever to correspond with the model length. The ordinary operator will not take the trouble to do this, preferring to waste a few blocks in making empirical trials. We have provided mechanism whereby the result produced by any setting of the length grader will be graphically evident without waste of blocks in trial.

This mechanism comprises a graduated scale 70 fastened to the model wheel carriage 14 at its left end and reading on the edge of a lug 72 on the machine frame, through which it slides. Thus any movement of the model wheel carriage can be read on the lug 72. A second graduated scale 74 is fastened to the model wheel carriage at its left end and reads on the edge of a similar lug 76 on the cutter carriage, through which it slides. This scale enables the difference in movement of the carriages to be seen directly.

Suppose that we have a model 9 inches long, and wish to reproduce the front 3 inches of it 3½ inches long, and the rear 6 inches, 6⅓ inches long, the thickness of the model wheel and cutter being one inch. We set the upper link 40 by trial so that while the model wheel carriage travels 3½ inches as shown by scale 70, the cutter carriage advances ½ inch on the model wheel carriage, adjust the two links 40 to shift the drive at this point, and also adjust the lower link so that as the model wheel carriage travels 6½ inches from this point, the cutter carriage will gain ⅓ inch on it. We have thus adjusted the lathe to cut accurately without wasting a block.

Figures 23, 24, 25:
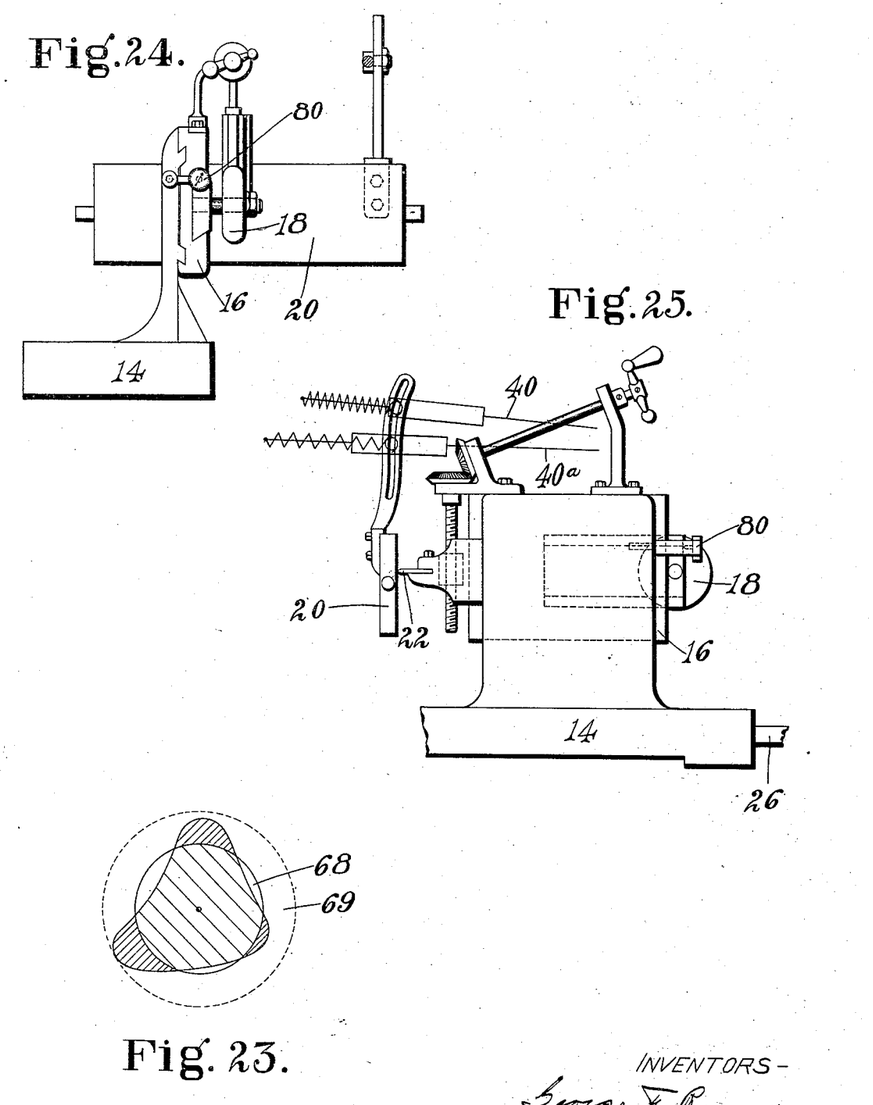
Figs. 23 is a diagram illustrating the use of the width grading mechanism.
Figs. 24 and 25 are front and side elevations of an arrangement for facilitating setting the width grading mechanism.

Figs. 24 and 25 show an analogous device attached to the width grading mechanism. An ordinary test indicator 80 is attached to the model wheel slide carrying standard with its feeler against the model wheel slide 16. If the model, after mounting in the swing frame, is rotated to any desired position in contact with the model wheel, the indicator will show the corresponding movement of the model wheel slide, and the amount graded on or off at the contact point of the model can be thus determined. In particular, we have found that the total range of movement of the indicator as the model bottom turns over the model wheel from one corner to the other will give very accurately the actual linear width grade of the model bottom at this point. This is of importance in maintaining the relation between lasts and sole patterns.

Having thus described the invention, what we claim as new and desire to secure by Letters Patent of the United States is:

1. In a pattern copying machine, a machine frame, model wheel and cutter carriages arranged to slide along the frame, and a grading mechanism having a plurality of grading controls arranged to come into action successively to effect a discontinuous change in relative speed of the carriages, whereby the speed of the cutter carriage relatively to the model wheel carriage may be different at the beginning than at the end of the copying operation.

2. In a pattern copying machine, a machine frame, model wheel and cutter carriages arranged to slide along the frame, and a grading mechanism having a plurality of grading controls arranged to come into action successively with substantially different mechanical advantages to control the relative speed of the carriages, whereby the speed of the cutter carriage relatively to the model wheel carriage may be different at the beginning than at the end of the copying operation.

3. In a pattern copying machine, a machine frame, model wheel and cutter carriages arranged to slide along the frame, and a grading mechanism having a plurality of grading controls connecting the carriages and arranged to bring the connections into action successively to control the relative speed of the carriages, whereby the ratio of the cutter carriage velocity to the model wheel carriage velocity is rendered different at the beginning than at the end of the copying operation.

4. In a pattern copying machine, a machine frame, two carriages arranged to slide along the frame, a grading lever connected to one carriage and pivoted on the frame, and a plurality of links connected to the other carriage and connected to the lever at separated points and constructed and arranged to come into operation successively beginning with that which is connected to the lever nearest its pivot.

5. In a pattern copying machine, a machine frame, two carriages arranged to slide along the frame, a grading lever connected to one carriage and pivoted on the frame, and a plurality of links connected to the other carriage and connected to the lever at separated points, said links having slots in both ends whereby they are connected to the carriage and lever respectively.

6. In a last lathe, a machine frame, two carriages arranged to slide along the frame, a grading lever connected to one carriage and pivoted on the frame, and a plurality of links pivoted to the other carriage and connected to the lever at separated points by a lost motion mechanism, comprising springs.

7. In a pattern copying machine, a machine frame, two carriages arranged to slide along the frame, a grading lever connected to one carriage and pivoted on the frame, and a plurality of links connected to the other carriage and connected to the lever at separated points, said links having pin and slot connections with the lever and being pivoted to the carriage.

8. In a pattern copying machine, a machine frame, two carriages arranged to slide along the frame, a grading lever connected to one carriage and pivoted on the frame, and a plurality of links connected to the other carriage and connected to the lever at separated points, said links having pin and slot connections with the lever and with the said other carriage.

9. In a pattern copying machine, a machine frame, two carriages, arranged to slide along the frame, a grading lever connected to one carriage and pivoted on the frame, a plurality of links connected to the other carriage and connected to the lever at separated points, said links having pin and slot connections with the lever and with the carriage, and springs tending to draw the pins to corresponding ends of the slots.

10. In a pattern copying machine, a machine frame, two carriages arranged to slide along the frame, a grading lever connected to one carriage and pivoted on the frame, a plurality of links connected to the other carriage and connected to the lever at separated points, said links having pin and slot connections with the lever and being pivoted to the carriage, and springs tending to pull the pins to corresponding ends of the slots.

11. In a pattern copying machine, a machine frame, two carriages arranged to slide along the frame, a grading lever connected to one carriage and pivoted on the frame, a plurality of links connected to the other carriage and connected to the lever at separated points, said links having pin and slot connections with the lever and being pivoted to the carriage, and resilient means tending to pull the pins to corresponding ends of the slots.

12. A grading mechanism for a pattern copying machine, comprising a moving member, a member arranged to be driven by said moving member, a lever connected to one of said members, and a plurality of links connected to the lever at separated points and connected to the other member, there being provision for lost motion in the connections between the links and the lever.

13. A grading mechanism for a pattern copying machine, comprising a moving member, a member arranged to be driven by said moving member, a lever connected to one of said members, and a plurality of links connected to the lever at separated points and connected to the other member, the connection between each link and the lever comprising a pin and slot.

14. A grading mechanism for a pattern copying machine, comprising a moving member, a member arranged to be driven by said moving member, a lever connected to one of said members, a pluarilty of links connected to the lever at separated points and connected to the other member, the connection between each link and the lever comprising a pin and slot, and resilient means for drawing the pins into corresponding ends of the slots.

15. A grading mechanism for a pattern copying machine, comprising a moving member, a member arranged to be driven by said moving member, a lever connected to one of said members, a plurality of links connected to the lever at separated points and connected to the other member, the connection between each link and the lever comprising a pin and slot, and springs for drawing the pins into corresponding ends of the slots.

16. That improvement in methods of producing solid articles having a systematic resemblance to a pattern, which consists in grading at successively different constant rates, successive concentric tubular elements of the pattern.

17. That improvement in methods of producing solid articles having a systematic resemblance to a pattern, which consists in grading at successive different but substantially constant rates those portions of the pattern lying between the members of a series of arbitrarily selected distances from the grading axis.

18. In a pattern reproducing machine, means for holding a model and a block, a model wheel and a tool, and a width grading mechanism constructed and arranged to grade at successive different but substantially constant rates a series of tubular elements each lying within the next, into which the model may be regarded as divided.

19. In a last lathe, four primary instrumentalities, viz: means for holding a last model, means for holding a last block; a model wheel and a tool; and a width grading mechanism connecting an instrumentality of each pair comprising a fan board and a plurality of links arranged to come into action successively in order to determine grading factors corresponding to a series of cylindrical elements each lying within the next, into which the model may be regarded as divided.

20. In a pattern reproducing machine, four primary instrumentalities, viz: means for holding a model, means for holding a block; a model wheel and a tool; and a width grading mechanism comprising a fanboard and connections between a member of each pair of primary instrumentalities, and means for automatically shifting the connection between the fanboard and one of the instrumentalities to which it is connected during a revolution of the model and block to bring into action different width grading factors corresponding to a series of circular tubes, each lying concentrically within the next.

21. A pattern copying machine comprising four primary instrumentalities, viz: a model holder and a block holder, a model wheel and a tool, and means for effecting relative movement between them to cause the tool to reproduce the model in the block by virtue of contact between the model and the model wheel, said means comprising grading mechanism having a plurality of grading controls arranged to come into action successively to effect a discontinuous change in the grading factor.

22. A pattern copying machine comprising four primary instrumentalities, viz: a model holder and a block holder, a model wheel and a tool, and means for effecting relative movement between them to cause the tool to reproduce the model in the block by virtue of contact between the model and the model wheel, said means comprising grading mechanism having a plurality of grading controls arranged to come into action successively to effect a discontinuous change in the grading factor and said grading mechanism comprising a lever connected to one primary instrumentality and a plurality of links connecting the said lever to a second primary instrumentality, one of said connections to each link comprising a lost motion device.

23. A pattern copying machine comprising four primary instrumentalities, viz: a model holder and a block holder, a model wheel and a tool, and means for effecting relative movement between them to cause the tool to reproduce the model in the block by virtue of contact between the model and the model wheel, said means comprising grading mechanism having a plurality of grading controls arranged to come into action successively to effect a discontinuous change in the grading factor and said grading mechanism comprising a lever connected to one primary instrumentality and a plurality of slotted links arranged side by side and connecting the said lever to a second primary instrumentality, the links having pin and slot connections with one of the elements above designated respectively as lever and second primary instrumentality.

24. A pattern copying machine comprising four primary instrumentalities, viz: a model holder and a block holder, a model wheel and a tool, and means for effecting relative movement between them to cause the tool to reproduce the model in the block by virtue of contact between the model and the model wheel, said means comprising grading mechanism having a plurality of grading controls arranged to come into action successively to effect a discontinuous change in the grading factor and said grading mechanism comprising a lever connected to one primary instrumentality and a plurality of slotted links arranged side by side and connecting the said lever to a second primary instrumentality, the links having pin and slot connections with one of the elements above designated respectively as lever and second primary instrumentality, and springs normally holding the pins in the ends of the slots.

25. A pattern copying machine comprising four primary instrumentalities, viz: a model holder and a block holder, a model wheel and a tool, and means for effecting relative movement between them to cause the tool to reproduce the model in the block by virtue of contact between the model and the model wheel, said means comprising grading mechanism having a plurality of grading controls arranged to come into action successively to effect a discontinuous change in the grading factor and said grading mechanism comprising a lever connected to one primary instrumentality and a plurality of slotted links arranged side by side and connecting the said lever to a second primary instrumentality, the links having pin and slot connections with the said lever.

26. A pattern copying machine comprising four primary instrumentalities, viz: a model holder and a block holder, a model wheel and a tool, and means for effecting relative movement between them to cause the tool to reproduce the model in the block by virtue of contact between the model and the model wheel, said means comprising grading mechanism having a plurality of grading controls arranged to come into action successively to effect a discontinuous change in the grading factor and said grading mechanism comprising a lever connected to one primary instrumentality and a plurality of slotted links arranged side by side and connecting the said lever to a second primary instrumentality, the links having pin and slot connections with the lever, and springs normally holding the pins in the ends of the slots.

27. A pattern copying machine comprising four primary instrumentalities, viz: a model holder and a block holder, a model wheel and a tool, and means for effecting relative movement between them to cause the tool to reproduce the model in the block by virtue of contact between the model and the model wheel, said means comprising grading mechanism having a plurality of grading controls each connecting two of the said primary instrumentalities and arranged to bring the connections into action successively to effect a change in the grading factor.

28. A pattern copying machine comprising four primary instrumentalities, viz: a model holder and a block holder, a model wheel and a tool, and means for effecting relative movement between them to cause the tool to reproduce the model in the block by virtue of contact between the model and the model wheel, said means comprising grading mechanism having a plurality of grading controls each connecting two of the said primary instrumentalities and arranged to bring the connections into action successively to effect a change in the grading factor, the grading factors increasing or decreasing, as desired, from one end of the series to the other.

29. A pattern copying machine comprising four primary instrumentalities, viz: a model holder and a block holder, a model wheel and a tool, and means for effecting relative movement between them to cause the tool to reproduce the model in the block by virtue of contact between the model and the model wheel, said means comprising grading mechanism having a plurality of grading controls arranged to come into action successively to effect a discontinuous change in the grading factor and said grading mechanism comprising a lever connected to one primary instrumentality and a plurality of slotted links arranged side by side and connecting the said lever to a second primary instrumentality, the links having pin and slot connections with one of the elements above designated respectively as lever and second primary instrumentality and coming into action successively as the lever swings, and the pins relating to the idle links riding in their slots.

In testimony whereof we have signed our names to this specification.

GEORGE FRANCIS RYAN.
ELMER HUNTON BURKE.